United States Patent [19]

Visser

[11] Patent Number: 4,970,824
[45] Date of Patent: Nov. 20, 1990

[54] APPARATUS FOR GRIPPING BALLS CONTAINING PLANTS

[75] Inventor: Anthony Visser, 's-Gravendeel, Netherlands

[73] Assignee: Visser's-Gravendeel Holding B.V., Netherlands

[21] Appl. No.: 294,742

[22] Filed: Jan. 9, 1989

[30] Foreign Application Priority Data

Jan. 8, 1988 [NL] Netherlands ................. 8800040

[51] Int. Cl.$^5$ .............................................. A01G 9/02
[52] U.S. Cl. .......................................... 47/86; 47/901; 249/73; 249/90; 425/286
[58] Field of Search ................... 47/87, 86; 425/286; 249/73, 90

[56] References Cited

U.S. PATENT DOCUMENTS

| 863,621 | 8/1907 | Medbury | 425/286 |
|---|---|---|---|
| 3,386,608 | 6/1968 | Diller | 47/86 |
| 3,810,329 | 5/1974 | Lecuru | 47/87 |
| 3,931,694 | 1/1976 | Krikorian | 47/87 |
| 4,006,558 | 2/1977 | Neddo | 47/86 |
| 4,389,814 | 6/1983 | Anderson | 47/87 |
| 4,854,075 | 8/1989 | Greiling | 47/86 |

FOREIGN PATENT DOCUMENTS

| 3507282 | 9/1986 | Fed. Rep. of Germany . |
|---|---|---|
| 2320882 | 3/1977 | France . |
| 2580457 | 10/1986 | France . |

OTHER PUBLICATIONS

Plantpak Grower Products from Grower Magazine; Nov. 15, 1982.
PCT International Publication No. WO86/01975, dated Apr. 10, 1986, to Michel Germaine.

Primary Examiner—Henry E. Raduazo
Attorney, Agent, or Firm—Watson, Cole, Grindle & Watson

[57] ABSTRACT

An apparatus for the gripping of plants located in a container is disclosed. This apparatus comprises a pushing element, which pushes the ball of the plant upwardly from underneath, until the ball is released for a substantial part above the container. Then the ball is gripped by a number of gripping arms, movable in a horizontal direction, which transports the ball including the plant to its destination. To be able to push the ball upwards the continer comprises at location of each of the cavities for the balls a guiding channel for the pushing element. This channel has a cross-section of a star-like configuration, the number of points thereof coinciding with the number of points of the pushing element.

7 Claims, 5 Drawing Sheets

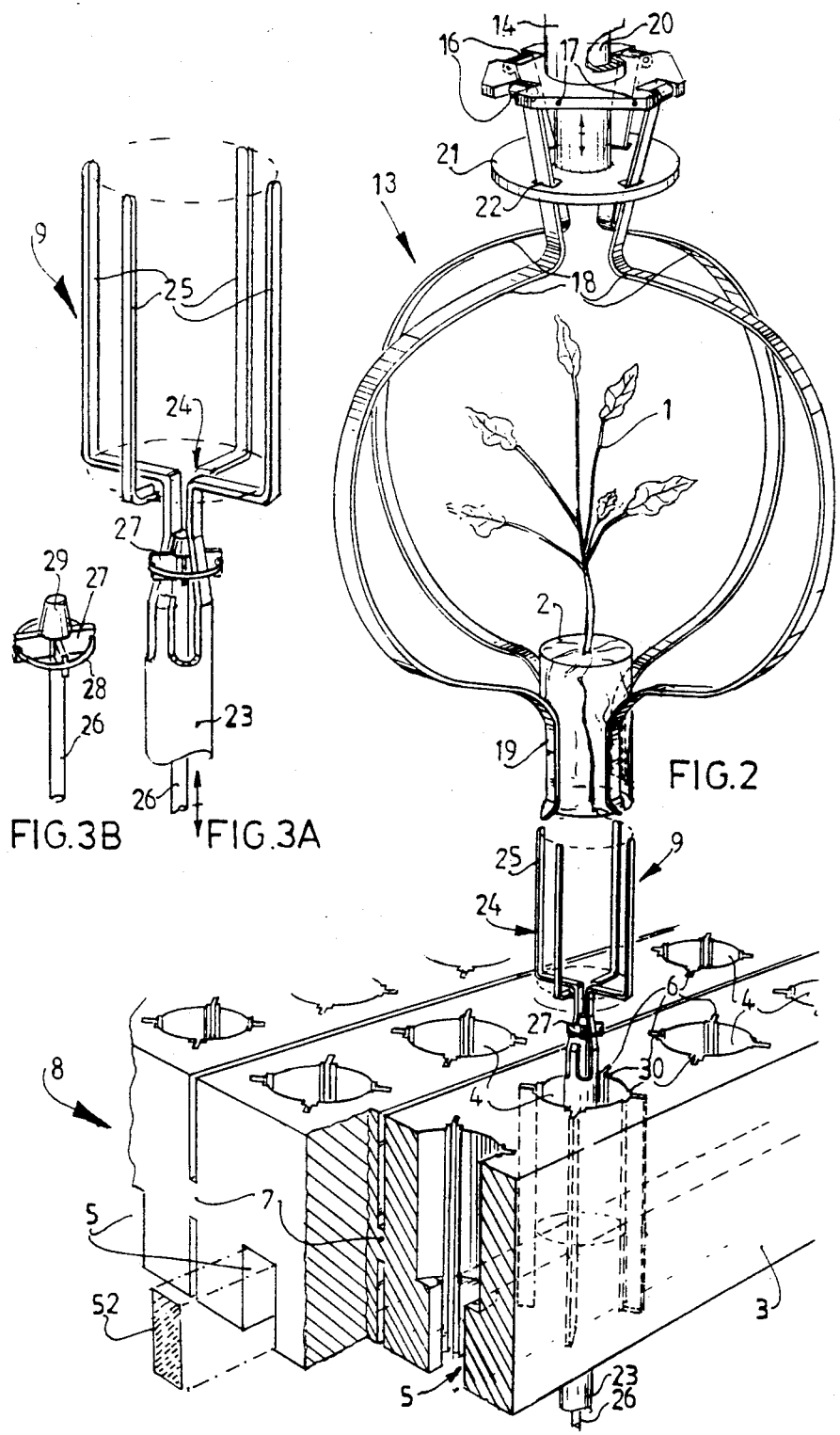

4,970,824

APPARATUS FOR GRIPPING BALLS CONTAINING PLANTS

BACKGROUND OF THE INVENTION

The present invention relates to the field of gripping apparatus for plants and relates in particular to an apparatus for removing a ball comprising a plant from a cavity, open at its upper side, and provided in a container.

Such apparatus are generally known.

Such known apparatuses generally have the disadvantage, that as a consequence of a too large pushing force, which is required to remove the ball from the container, the ball is pulverised or the plant is damaged. It also may happen that it is not possible to grip the ball of the plant effectively without damaging the leaves or the flowers of the plant because the plant is approached from above. Of course, such damage is undesired.

The aim of the present invention is to provide an apparatus in which it is avoided that neither the plant nor the ball is damaged, and wherein the ball is gripped in a sure way, and wherein the position of the ball is reproducable.

SUMMARY OF THE INVENTION

This aim is reached in that the container comprises a substantially vertical guiding channel of which the axis is substantially identical with the axis of the cavity, that a pushing element has been provided, which is movable through the guiding channel; and that a gripping apparatus has been provided, comprising at least three gripping organs, which are able to grip the ball above the upper side of the container.

It is also the aim of the invention to provide a container, which can be used adventageously with the apparatus according to the present invention. As a consequence of these measures it is possible to push the ball from the cavity from underneath, so that at least a part of the ball is released for gripping by the gripping organs. When the gripping organs have gripped the ball, this can further be conveyed by the gripping organs and be treated further. Whereas the ball of the plant is pushed upward to some extent, it becomes easy for the gripping organs to grip the plant at its ball, so that the danger of damaging the plant by gripping the plant or by gripping the ball from above is avoided as much as possible.

BRIEF DESCRIPTION OF THE DRAWINGS

Subsequently the present invention will be elucidated with the help of embodiments shown in the drawings, wherein:

FIG. 2: depicts a schematic perspective view of a variation of the embodiment shown in FIG. 1, in which the apparatus is in another position:

FIG. 3A en 3B: perspective detailed views of the variation of the first embodiment shown in FIG. 2;

DETAILED DESCRIPTION OF THE PREFERRED EMBODIMENTS

Figure 1:
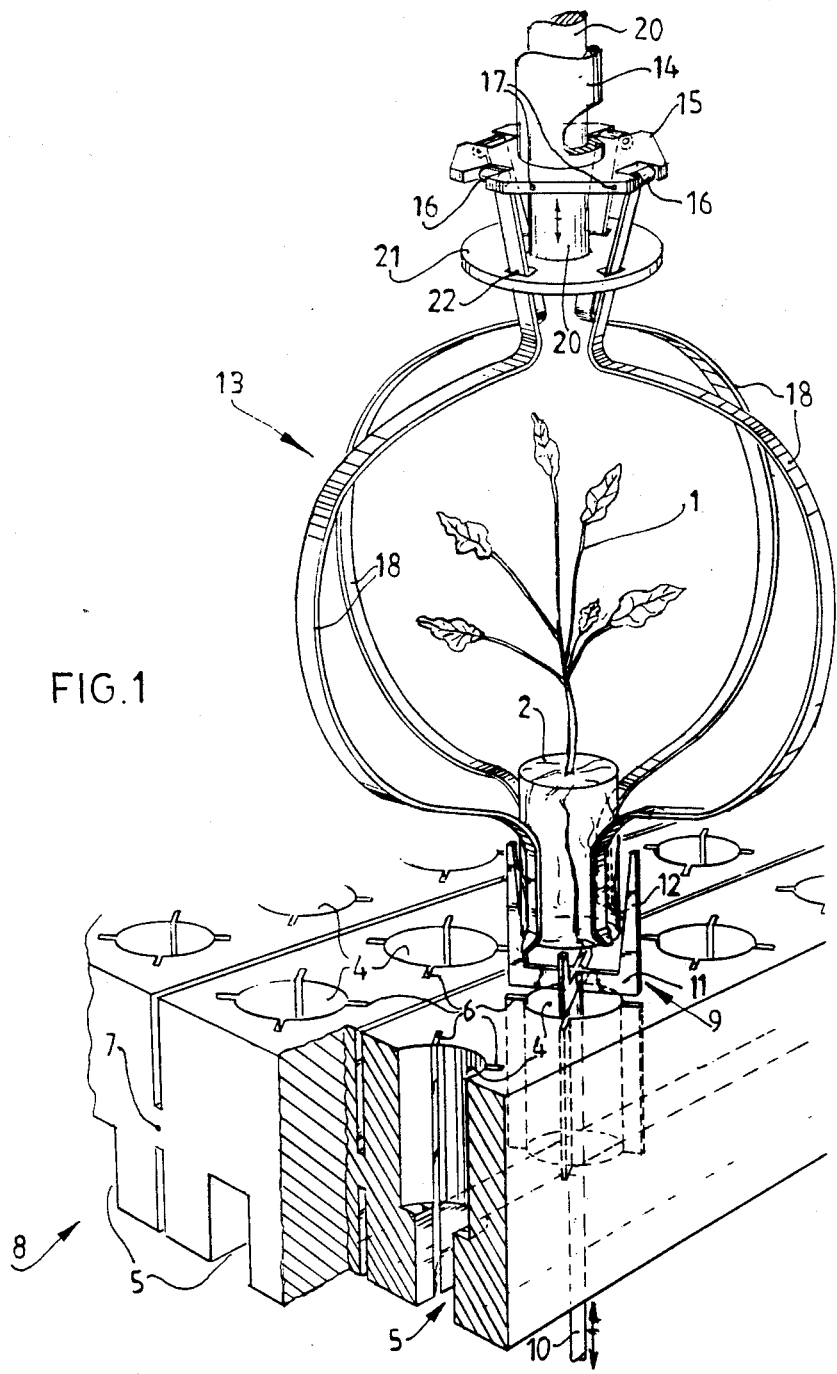
FIG. 1: depicts a schematic perspective view, partly broken away, of a first embodiment of an embodiment according to the present invention.

In the embodiment shown in FIG. 1 the ball 2 comprising a plant 1 has been provided in a strip-shaped container 3. The upper side of this container 3 comprises an array of substantially cylindrical cavities 4, while the lower side of the strip-shaped container comprises a groove 5 extending in the longitudinal direction of the container. Concentric with each of the cylindrical cavities 4 a cross- of star-shaped through aperture has been provided, which, as a consequence of the presence of the cavities 4 and of the grooves 5 is shown in the drawing in the shape of four grooves 6 extending radially from the cavities 4. These grooves extend over the full height of the strip-shaped container 3, including the groove 5.

In addition, a number of the strip-shaped containers 3 has been composed to a so-called tray 8 by means of connection strips 7. This facillitates the handling of such strips. Normally, the cavities 4 of the strip-shaped containers are filled with growing material and subsequently are provided with a seed, which actions are executed with apparatuses known per se, after which trays 8 comprising such strips are located in a propagator, after which the plants will germinate. As a consequence thereof, in most of the cavities 4 a ball 2 with a plant 1 will be present.

For removing the ball 2 with the plant 1 from the container, use is made inter alia of a pushing organ 9, which comprises a vertical rod 10, driven in vertical direction by means of a lineair driving apparatus not depicted in the drawing, on which vertical rod 10 four radially extending levers 11 have been provided, while on each of the ends of the levers 11 an elongation 12 extending upwardly has been provided. Preferably, the elongations 12 are beveled at their inner sides to facillitate the gripping of the balls 2. Of course it is also possible to bevel the outer side of the alengation to some extent, so that the entering into the guiding grooves 6 is facillitated.

Above the pushing organ 9, a gripping apparatus 13 has been provided, which is located exactly above the pushing organ 9 and which is movable both in the horizontal and in the vertical direction for conveying the ball 2 with the plant 1 provided therein. The gripping apparatus 13 has been mounted to a hollow rod 14, being movable in substantially the vertical direction, at the lower side of which a bearing plate 15 has been provided. This bearing plate 15 comprises four notches distributed regularly over the incumference, in which notches substantially tangentially extending shafts 17 have been provided. A gripping lever 18 has been mounted around each of the shafts 17.

Each of the gripping levers 18 extends from the shaft 17 initially downwards but also inwards to some extend. Subsequently, the gripping lever extends substantially in radial direction outwardly, while after which a curve of about 180° is described, so that at the end of the curve, the lever stretches inwardly. The last part of the gripping lever 18 stretches downwardly and forms the gripping part 19 of the gripping lever 18.

An inner rod 20 extends through the hollow rod 14, at the lower side of which a guiding plate 21 has been provided. The guiding plate 21 comprises four apertures 22 through each of which the gripping lever 18 extends. As a consequence of the shape of the gripping levers 18, the movement in vertical direction of the rod 20 and the movement of the guiding plate 21 as a consequence thereof, will cause the gripping levers 18 to rotate around the shafts 17. As a consequence thereof the gripping part 19 of each of the gripping levers 18 will move in radial direction inwardly or outwardly, so that a ball 2 can be gripped and can be released. The curve of each of the gripping levers 18 has been provided for leave space to the leaves, flowers and stems of the plants.

Subsequently the working of the embodiment shown in this figure will be described. The tray 8 comprising strips 3 positioned such above a pushing organ 9 that a cavity 4 is exactly above the pushing organ 9. Then the driving apparatus will move the rod 10 with the levers 11 and elongations 12 thereof upwardly, so that these will move through the guiding grooves 6 provided in the strip-shaped container 3, so that the ball 2 is engaged at its lower side body arms 11 and at its side by the elongations 12 and is moved upwardly. Herein the ball 2 and the plant 1 provided therein is released from the cavity 4 until it is above the upper side of the strip-shaped container 3.

The gripping apparatus 13 also positioned just above the pushing organ will be lowered by a driving apparatus not depicted in the drawings, after which the gripping parts 19 of the gripping levers 18 are on the level of the ball 2. Also the guiding plate 21 has been located in its lowest position, so that the gripping parts 19 are in their outer position. By moving the rod 20 upwardly and away from the guiding plate 21, the upper parts of the gripping levers 18 are drawn inwardly, so that also the gripping parts of the gripping levers 18 are drawn inwardly and these are gripping the ball 2. Care has to be taken that the gripping parts 19 grip between the elongations 12 Subsequently the whole gripping apparatus 13 is moved upwardly and thus the plant can be transported to another position, for instance to a planting machine or to an apparatus for locating the ball and the plant in a bigger container. The pushing organ can be moved downwardly, after which the container can be relocated over one position and the next ball can be gripped.

The position in which the ball has been moved until above the pushing organ by the gripping apparatus 13 is depicted in FIG. 2. The embodiment shown in FIG. 2 deviates from the embodiment depicted in FIG. 1 in that the pushing organ has been constructed differently.

This pushing organ is depicted in more detail in FIG. 3A and 3B. The embodiment shown in FIG. 3A and 3B of the pushing organ comprises again a hollow rod 23, movable in the vertical direction, which is split at its upper side into four gripping levers 24. Just as in the case of the gripping apparatus 13, the gripping levers 24 extend initially in subsequently vertical direction, but also somewhat in radial direction inwardly, in which each of the gripping arms comprises a vertical part, a horizontal part, directed radially outwardly, and the vertical part which is meant to grip the ball. Within the hollow rod 23 an inner rod 26 extends, which comprises at its upper side a cross 27, as shown in FIG. 3B, which is surrounded by a ring 28. On top of the cross 27 a conical element 29 has been located.

By moving the rod 26 in vertical direction relative to the rod 24, the gripping parts 25 of the gripping arms can be relocated in a radial direction, so that the pushing element according to this embodiment also has a gripping function, which can be important in the case of some plants.

To offer room for the thickness of the gripping arms 24, guiding grooves provided in the strip-shaped containers 3 comprises thickenings 30.

Figure 4:
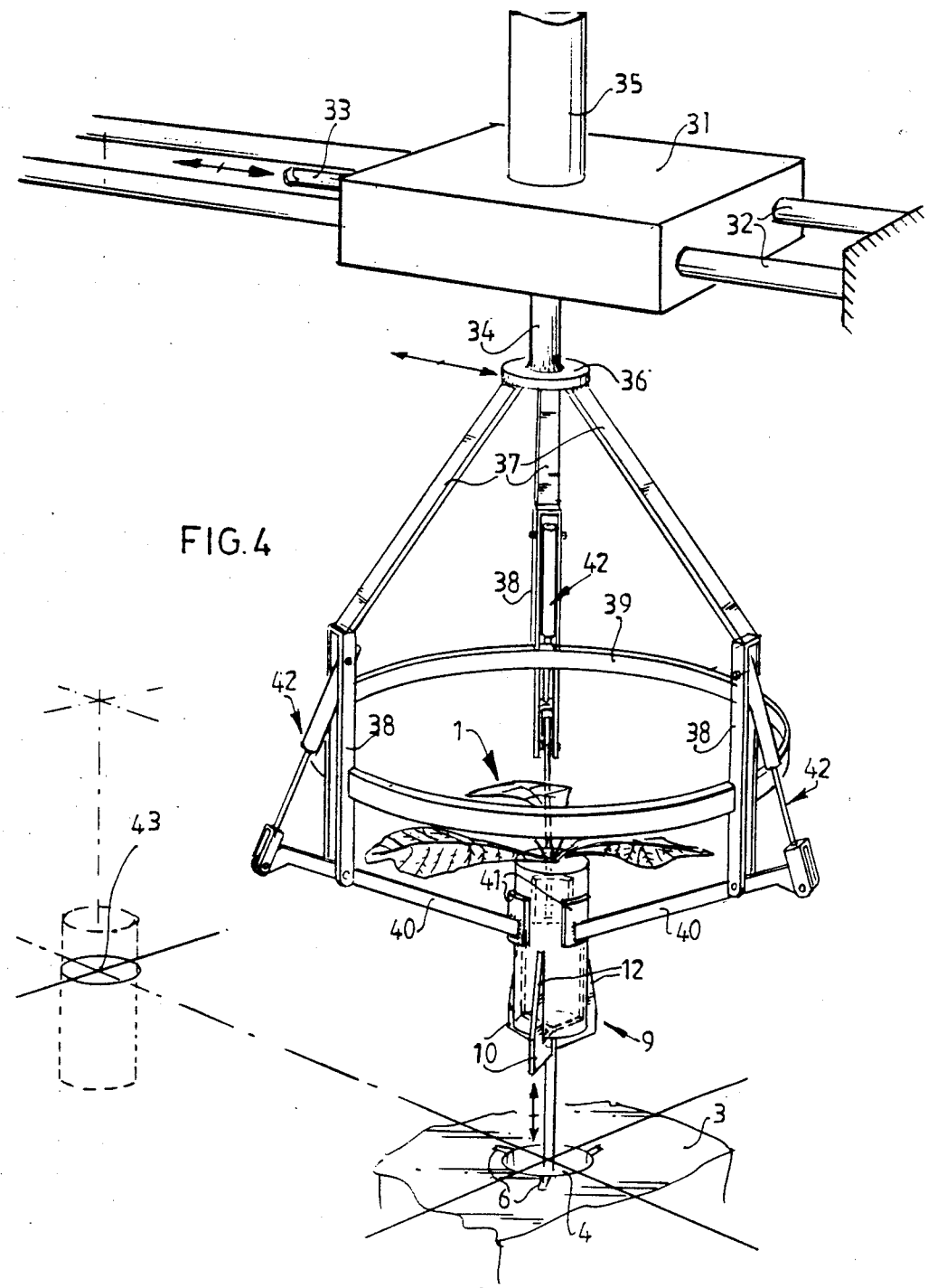
FIG. 4: a schematic perspective view of a second embodiment of the present invention.

In the embodiment of the present invention shown in FIG. 4, each of the cavities 4 provided in the strip-shaped container 3 comprises only three guiding grooves 6. Consequently it is necessary that the pushing organ 9 comprises three rods 10 comprising an elongation 12 at every end. Further this embodiment corresponds to the embodiment described in FIG. 1.

The gripping apparatus deviates, however, substantially; the gripping apparatus has been mounted on a supporting element 31 which is movable over two rods 32. For driving this, a driving rod 33 has been provided, which is depicted only partially. Under the bearing element a vertical rod 34 has been provided, which is movable in the vertical direction by means of a linear driving organ 35.

At the under side of the rod 34 a plate 36 has been mounted, to which three rods 37 extending partially in the vertical direction downwardly and partially radially outwardly have been mounted. At the end of each of the rods 27 a U-shaped rod 38 has been provided, having legs which extend downwardly in the vertical direction. Each of said rods 38 is connected with a ring 39. At the lower side of each pair of legs of the rod 38, a shaft 55 has been mounted, around which rod 40 is movable. At the inner end of each of the rods 40 a gripping plate 41 has been provided, while at the other end of the rod 40 one end of the linear driving organ 42 has been provided. This linear driving organ can take the shape of a hydraulic or a pneumatic cylinder or a linear electromotor.

Subsequently the working of the present embodiment will be described. The working of the pushing organ 9 is therein equal to that of the pushing organ 9 described in FIG. 1. The supporting element 31 is positioned such that the shaft 34 is precisely above the cavity 4. Herein the linear driving organs 42 have been pulled inwardly, so that the gripping plates 41 are in their outer position. Herein the vertical rod 34 is moved downwardly until the gripping plates 41 are at the level of the ball 2. Thereafter the linear driving organs will stretch, so that the gripping plates 41 will be moved inwardly and upwardly. To compensate this movement, the linear driving organ 35 will move the vertical rod 34 such in downward direction, that this vertical component of movement is eliminated and the gripping plates 41 are moved in substantial horizontal direction. This movement is continued until the ball has been gripped. Subsequently the pushing organ can be moved downwardly, while the ball 2 with the plant 1 located therein can be transported to another position, for instance the position 43 depicted with dashed lines.

Figure 5:
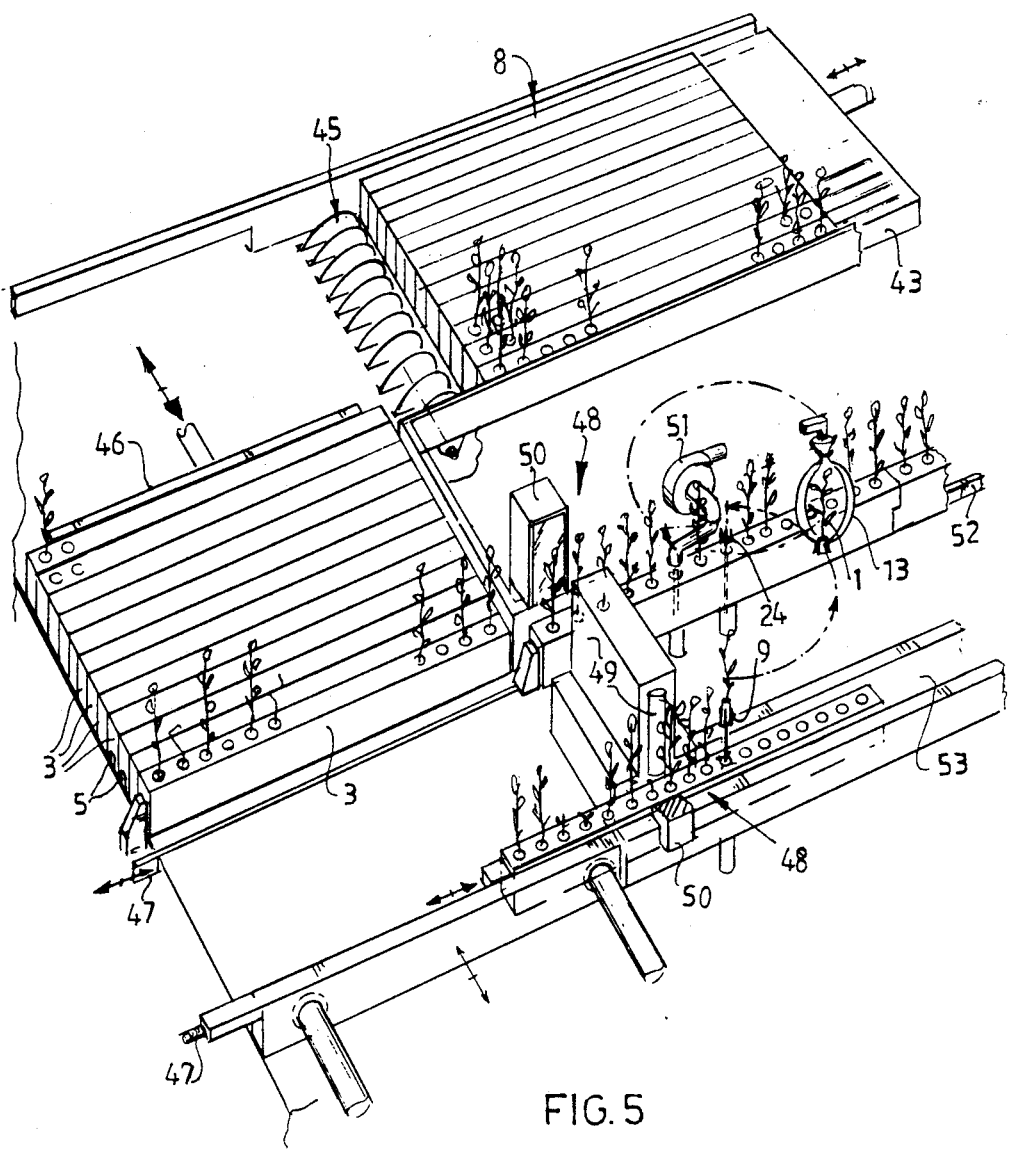
FIG. 5: a partly schematic perspective view of an apparatus for obtaining a full density of strips, containing plants, in which the apparatus according to the present invention is used.

FIG. 5 shows a application of the apparatus according to the present invention. In this application use is made of a supply apparatus 44 for supplying strip-shaped containers 3 in the shape of trays, and in the cavities 4 whereof plants 1 have been provided. To further process these trays 8, they are separated by a saw apparatus 45, so that separate strip-shaped containers 3 are developed. These are moved in a direction extending perpendicular to the original direction of supply by means of a transporting organ 46, after which they are subsequently step-wise drawn through a second pushing apparatus 47, wherein plants 1 located in the cavities 4 of the relevant strip-shaped container are examined.

Such an examination apparatus can be composed by a light source 49 located at one side of the path to be travelled over by the plants and a light sensitive element located at the other side of the relevant path. This examination apparatus 48 determines whether a plant 1 is present in the cavity concerned, and when this is the case, whether the size of the plant is sufficient. When the plant 1 does not need the requirements, the relevant ball and the plant 1 present therein is removed from the relevant cavity by means of a removal apparatus 51, after which a plant 1 from another strip-shaped container 3 is supplied by means of an apparatus depicted only schematically.

Consequently all cavities 4 of the relevant stripshaped container are completely filled with healthy plants. To have a healthy plant available always a second examination organ 48 has been provided, which examines plants located in the other strip-shaped container. When all healthy plants have been removed from this second container a next container is supplied by the transport apparatus, so that also the examination organ 48 has a sufficient supply of healthy plants.

The apparatus according to the present invention can also be used with a planting machine or in a machine for locating the plants in bigger containers.

Figure 6A:
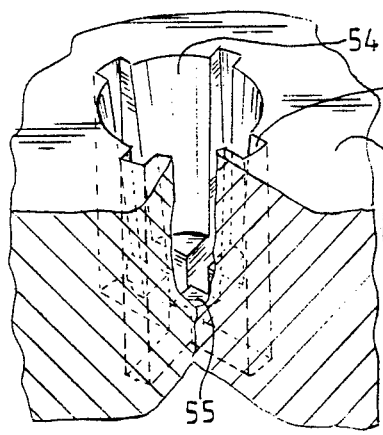
FIG. 6a: a perspective view, partly broken away of a cavity of the tray according to FIG. 6.
Figure 6B:
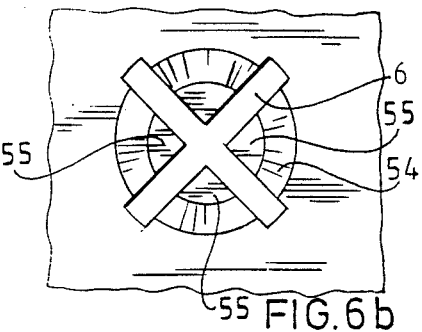
FIG. 6b: top view of a cavity of the tray according to FIG. 6.
Figure 6:
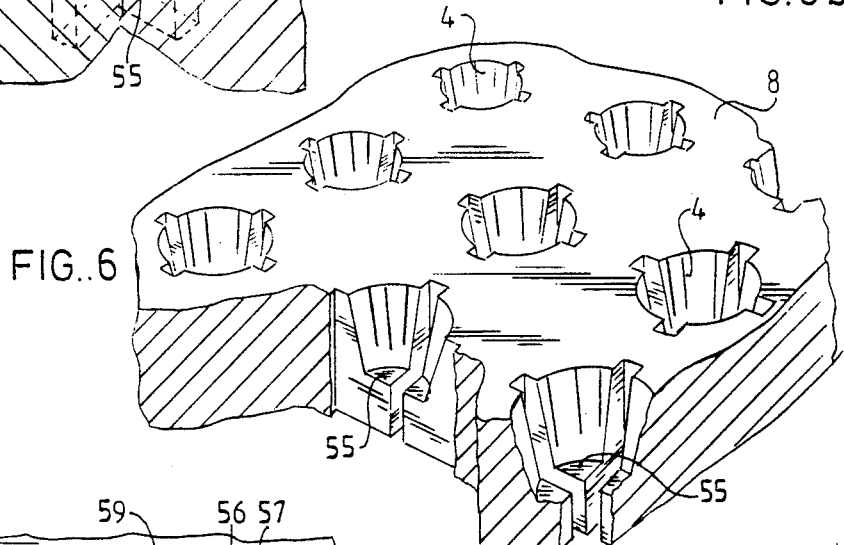
FIG. 6: a perspective view, partly broken away, of a tray, which can be applied advantageously with the present invention.
Figure 7:
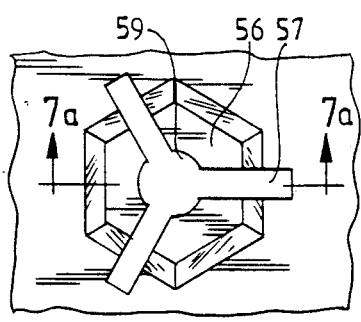
FIG. 7: a top view of a second embodiment of a cavity in a tray.
Figure 8:
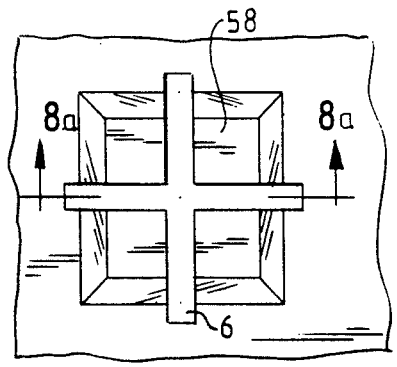
FIG. 8: a top view of a third embodiment of a cavity in a tray.
Figure 8A:
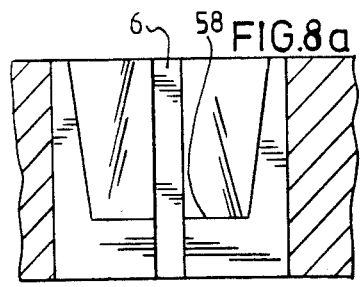
FIG. 8a: a cross-sectional view of the cavity according to FIG. 7 along the line VIIIa—VIIIa.

Subsequently some embodiments of trays will be described, which are depicted in FIG. 6–8.

FIG. 6 shows a part of a tray which can be applied with the apparatus according to the present invention. The tray 8 comprises cavities 4 provided according to a regular patern. Each of the cavities comprises, as is shown clearly in FIG. 6, a conical part 54, which has a bottom at its lower side. The slight conicity of this conical part 54 serves to facillitate the production of the tray. By this conicity the trays can be released easily from the mould. Of course, the ball present in the cavity can easily be pushed upwards. The conicity is, however, not essential for the invention.

Further, central with the conical cavity 54 a cross-shaped guiding channel 6 has been provided which extends until the underside of the tray 8. By having the cross-shaped guiding channel 6 and the cavity 54 coincide the underside of the bottom 54 is separated until four pieces 55 which each have the shape of a circle-segment. Consequently the bottom of the aperture 54 is not continuous.

This has the advantage that the roots of a plant being present in the ball tend to grow according to a circular movement along the bottom of the container, in this case the bottom of the conical cavity. Generally this circular growing is not desired, as a kind of programming of the roots takes place. When the ball with the plant is planted in a bigger container or in the soil, the roots will tend to continue the circular movement and will grow according to a circle, so that the roots will extend only outside the original ball to a small extend and the original ball is separated within the bigger container or in the soil. Of course this is not desired as the ability to obtain water and nutrition from the surrounding soil is limited considerably and the plant may become loose in the ground.

As the bottom of the container has been divided into pieces, so that the round going tendation of the roots is broken off and the roots will grow downwardly, guided by the guiding channel 6.

The previous consideration is valid for the conical sides of the cavity 54 so that these conical sides are broken up by guiding grooves 6 and the tending to grow around is eliminated.

Figure 7A:
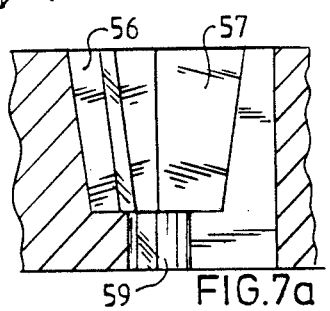
FIG. 7a: a cross-sectional view of the cavity according to FIG. 7 along the line VIIa—VIIa.

In the embodiment shown in FIG. 7 a hexagonal cavity 56 is shown in which a guiding channel 57 has been provided in the shape of a three-pointed star, so that every second side of the hexagonal cavity 56 comprises a guiding groove. The cavity 56 is again conical to ease the release of the tray 8. Further a three-pointed star configuration of the guiding channel 57 makes this tray fit for a gripping element 11 comprising three elongations. A cross-section of the cavity is shown in FIG. 7a. Also in this case, both the bottom and the sides are broken to eliminate the circular growing of the roots.

Further the embodiment shown in FIG. 7 deviates in that in the bottom an extra aperture 59 has been provided which connects the cavity with the underside. In FIG. 7 this extra opening is round, thus it can accommodate every shape and it does not have to be equal to the shape of the relevant cavity.

Finally FIG. 8 shows a next embodiment in which the cavity 58 is square and in which a cross-shaped guiding channel 6 has been provided. Instead of round, hexagonal or square cavities with other shapes can be applied, such as polygonal ones or oval ones.

I claim:

1. Container for plants being provided in balls, comprising a substantially flat body, in which cavities open towards an upper side are provided according to a regular pattern, the cavities having a lower shelf for supporting the plant balls wherein each cavity has an associated through going guiding channel having a star-like configuration located such that the star-shaped configuration is coaxial with the cavity, in which points of the star-shaped configuration extend beyond the outer periphery of the cavity to form through going guiding grooves.

2. Container according to claim 1, wherein the cavity has the shape of a truncated cone.

3. Container according to claim 1, wherein that the cavity is round.

4. Container according to claim 1 or 2, the cavity is polygonal.

5. Container according to claim 1 wherein the flat body can be parted into strips by means of breaking grooves, in which every strip comprises at least one array of cavities.

6. Container according to claim 5, wherein (stet) of the strips comprises at its lower side a guiding groove.

7. Container according to claim 1 wherein each of the cavities comprises an extra aperture at its lower side.

* * * * *